United States Patent Office 3,218,728
Patented Nov. 23, 1965

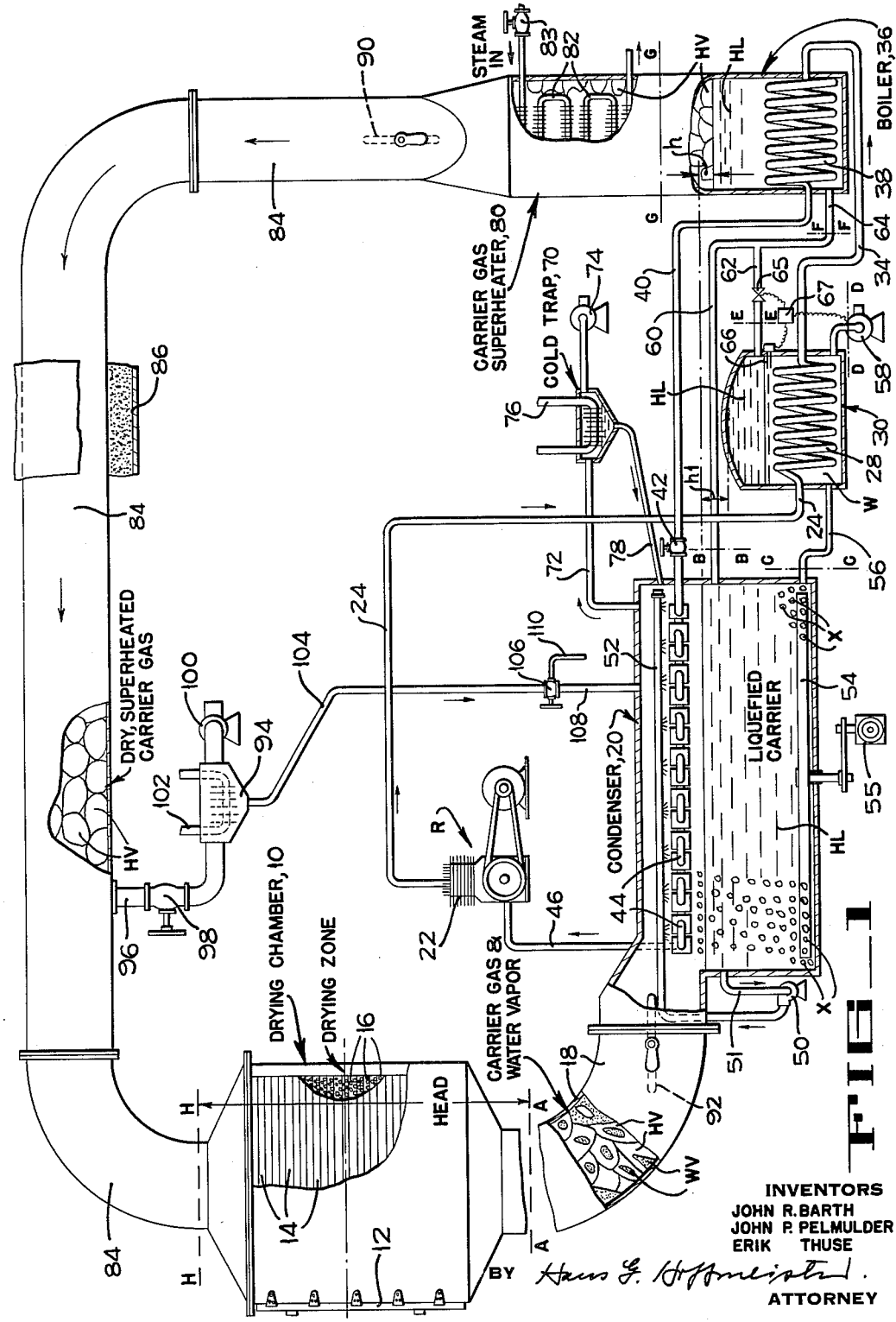

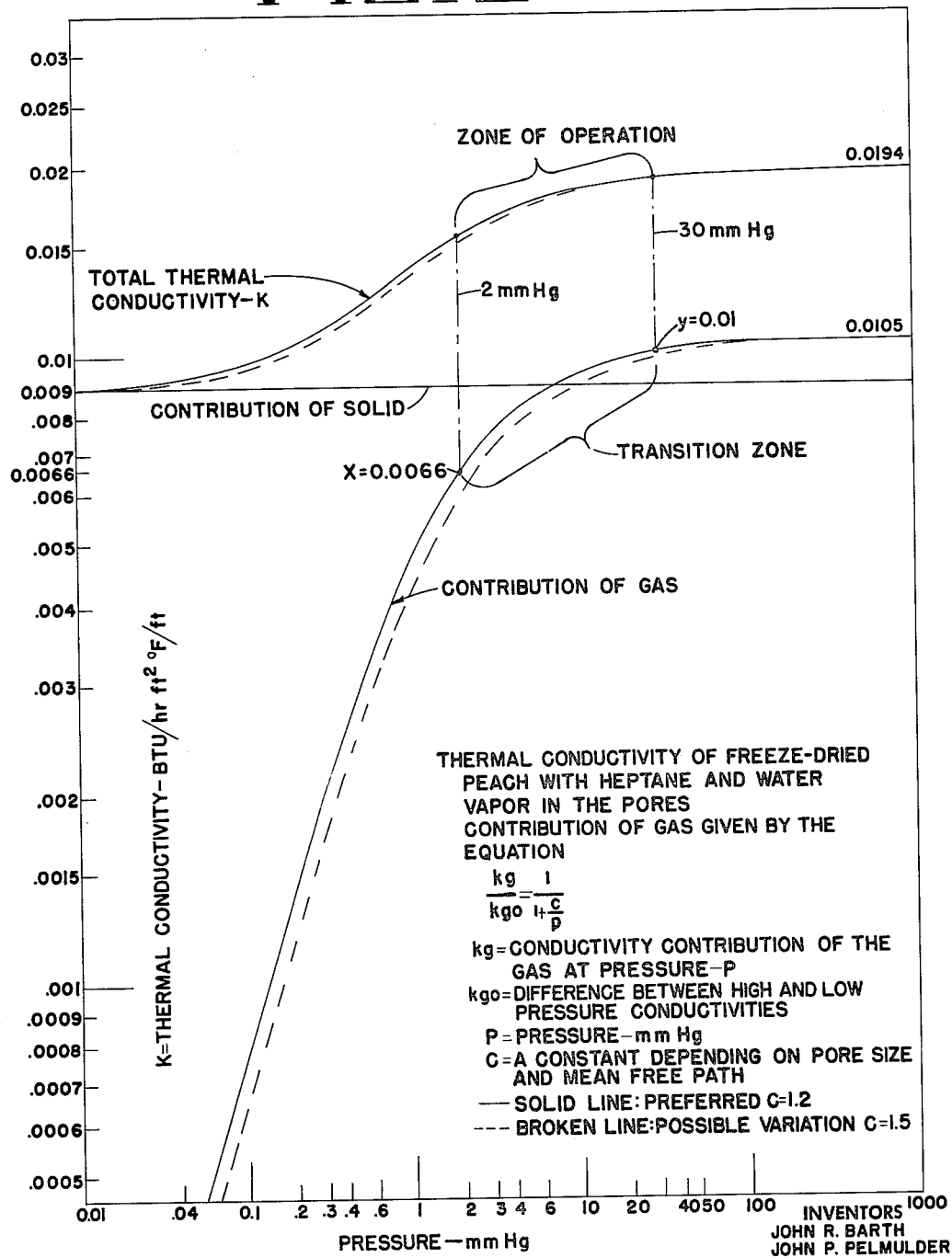

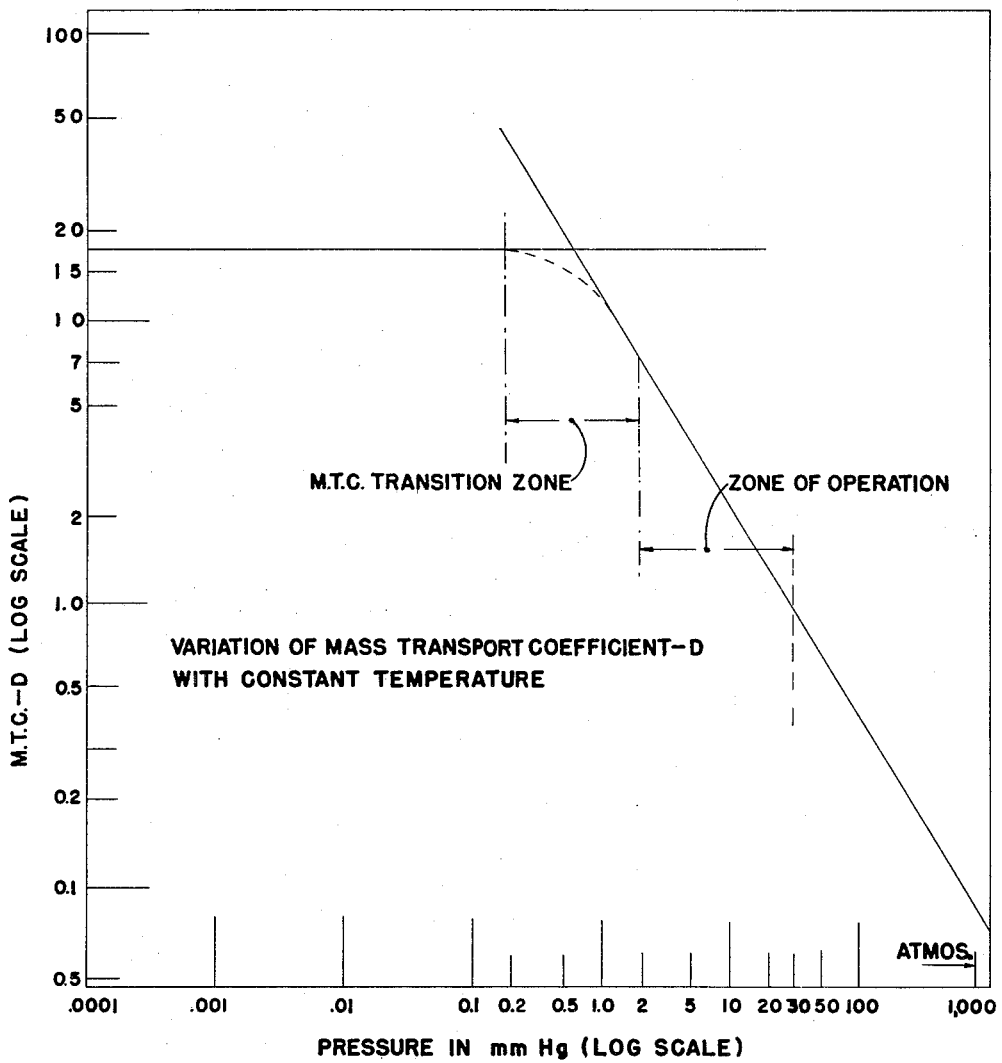

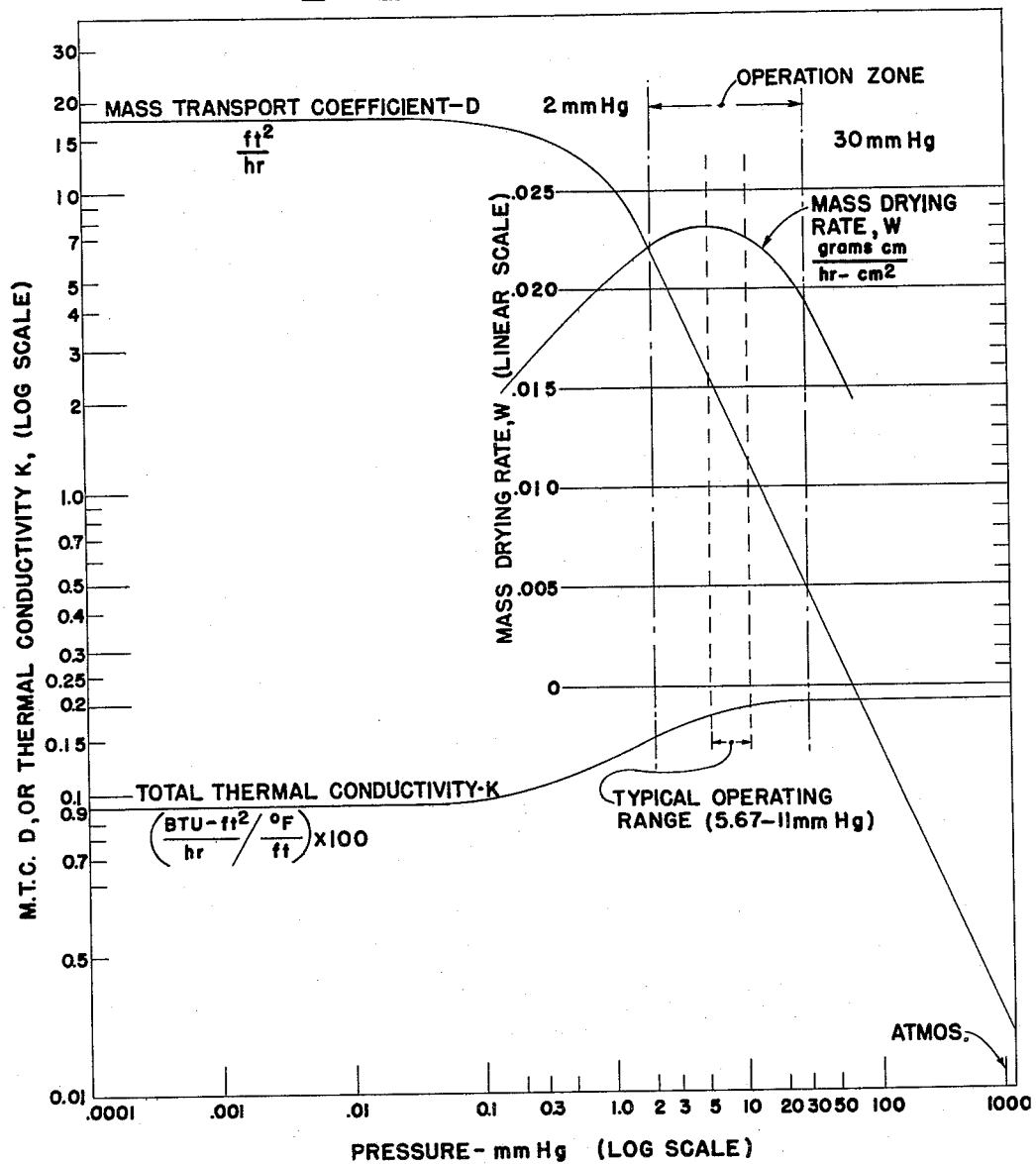

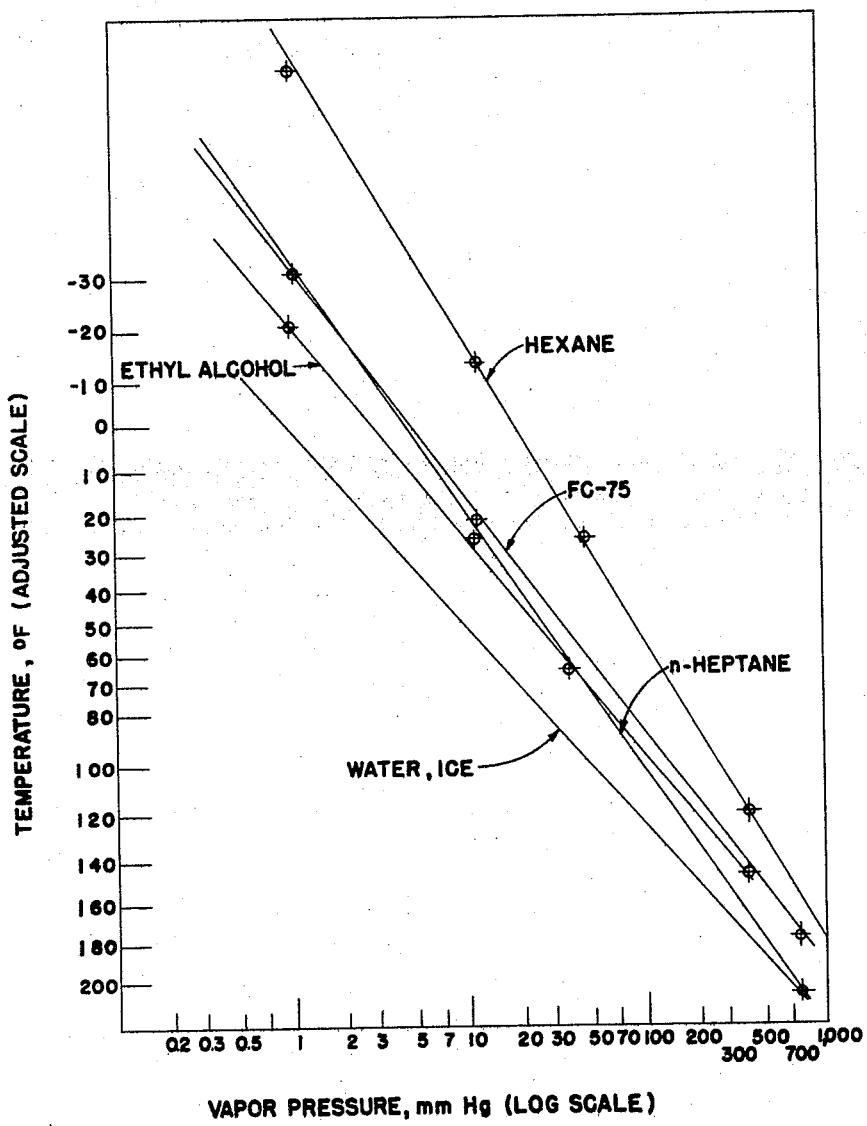

3,218,728
LOW PRESSURE CARRIER GAS SUBLIMATION
John R. Barth, Palo Alto, John P. Pelmulder, Saratoga, and Erik Thuse, San Jose, Calif., assignors to FMC Corporation, San Jose, Calif., a corporation of Delaware
Filed Apr. 8, 1963, Ser. No. 271,083
11 Claims. (Cl. 34—5)

This invention relates to the freeze drying of cellular articles or porous material, such as food products or the like. The freeze drying process involves freezing the articles, placing the frozen articles in a low pressure drying chamber, applying heat to cause the ice to sublime, removing the water vapor from the chamber as it is formed, and continuing the process until the products are dried. If desired, the articles may be frozen directly in the drying chamber, before the sublimation step.

In this process, since substantially no liquid evolves during the drying of the articles, the fibers or matrix structures of the articles, such as foods, are not wetted sufficiently, at the drying temperatures involved, to damage their commercial acceptability as dried, rapidly reconstitutable articles. Also, the articles need not be subjected to temperatures that are high enough to cause scorching or deterioration. When the dried articles are reconstituted by the addition of water, their original characteristics, including their flavor, are largely restored. Processes of this type, to which the present invention relates, are commonly referred to as freeze drying processes, and this term will be used as this specification proceeds, in reference to the process of the invention, and the apparatus for carrying out the processes. Although the embodiment of the invention to be described is a freeze drying process, in the broader aspects of the invention, the process can be employed to dry products that are not frozen, but which will be adversely affected by the application of excess heat. Also, the process can be used to remove liquids other than water from substances other than food.

Two major obstacles have prevented widespread use of large capacity freeze drying processes in the drying of food products such as fruit, vegetables, meats, etc. The first obstacle is that the drying time is considerable, resulting in an inefficient use of costly personnel and equipment. The other obstacle is that the operating costs, such as pumping costs, power charges, and heat loss factors have been high. Since dried foods must be sold in a highly competitive market, a system that might be satisfactory for laboratory use, such as the preparation of relatively small quantities of high priced biologicals, often becomes economically unfeasible when operating on the tonnage basis required in the food industry.

As will be explained in detail presently, the system of the present invention employs a condensible carrier gas, which gas flows at low pressure through the driving chamber during the drying process, and serves the dual function of supplying the heat of sublimation (or drying) for liberating water vapor from the ice core of the material being dried, as well as that of sweeping the sublimed water vapor from the surface of the material being dried out of the drying chamber.

In a freeze drying process the ice at the surface of the product sublimes first leaving a dry porous outer layer which surrounds a core of frozen product. In the present invention, the carrier gas diffuses through the shell of dried material that surrounds the ice core causing it to be present in the pores, "cells," or interstices of the material matrix. Thus, heat is transferred to the ice core from the carrier gas by conduction through the gas in the pores, and by conduction through the shell of dried material that surrounds the ice core to the ice core.

In the present invention, the carrier gas and entrained water vapor flow from the drying chamber to a refrigerated condenser, wherein these vapors are condensed. The carrier gas is condensed into a liquid and the water vapor is condensed into ice, which is later melted. The liquefied carrier gas is gravity separated from the water, and the carrier gas is reheated to restore it to its vapor, or gaseous phase, ready for re-circulation through the drying chamber.

In the operation of the system, the pressure in the drying chamber is maintained low enough to ensure that the carrier gas and water vapor are not cooled to their respective dew points while they pass through the drying chamber. The carrier gas is vaporized prior to its introduction into the drying chamber, and is condensed at a lower temperature after its removal from the drying chamber, so that a pressure differential is established across the drying chamber which supplies the driving force necessary to cause the carrier gas to flow through the drying chamber. Thus the carrier gas supplies the heat of sublimation, and sweeps away the sublimed water vapor, yet no blower is required for circulating the carrier gas through the drying chamber.

Stated differently, the food in the drying chamber acts as a flow restrictor in the carrier gas circuit, and as the hot carrier gas gives up its heat to the food, the temperature and partial pressure of the carrier gas drop, finally reaching the partial pressure present in the vapor condenser. This pressure differential between the inlet and outlet of the drying chamber serves as the pumping or circulating head for the carrier gas and entrained water vapor.

As previously mentioned, the carrier gas, upon leaving the drying chamber under the aforesaid pressure head, carries the sublimed water vapor into the vapor condenser. Here refrigerated coils abstract the heat required to condense (liquefy) the carrier gas and to freeze the entrained water vapor into ice crystals.

It is an object of the present invention to provide a carrier gas freeze drying process which completes the drying cycle in a relatively short period of time, at an economically acceptable total capital and operating cost. Processes wherein all factors are subjugated to speed of drying are known, but prior processes of this type are commercially unacceptable. For example, it has been suggested that the heat of sublimation be supplied to the ice core at a rapid rate by employing radiant heat for the initial drying stage, and then completing the drying using microwave heating. However, the capital cost of such a system in large scale operation would be excessive and non-competitive. In accordance with the present invention, radiant and microwave heating can be employed early in the drying cycle where sublimation is rapid, and a carrier gas can be employed later in the cycle when sublimation becomes more difficult.

Another object of the present invention is to provide a freeze drying system of the carrier gas type which does not require mechanical pumping to obtain the necessary carrier gas flow through the drying chamber. These objects are accomplished by the use of a carrier gas that is condensible at practical temperatures and pressures, and which is immiscible with water.

A further object is to operate the condensible carrier gas system over a pressure and temperature range which enables the system to approach the maximum mass drying rate that is theoretically attainable in a carrier gas system. The term "mass drying rate" can be defined as the weight of water vapor removed per hour, through a unit area, and through a unit thickness of the dried material. Mass drying rate may also be defined as the weight of water removed per hour divided by the initial weight of the product including the water in the product. In the present invention, the mass drying rate is optimized by selecting an operating zone wherein the gas pressure is high enough to provide excellent heat transfer to the ice core by conduction, but is not so high as to unduly inhibit the transport of liberated water vapor from the ice core and through the shell of dried material.

Another object is to provide a freeze drying system that lends itself to the use of a continuous, conveyor loading process. This is feasible in the carrier gas system of the present invention, because drying takes place relatively rapidly, and, for a given output capacity, it is not necessary to accommodate a large quantity of the product in the drying chamber at any one time. In this respect, the carrier gas system of the present invention is superior to the conventional vacuum drying system, wherein the water vapor is merely pumped out or condensed as it is formed, and the pressure may be less than one millimeter (mm.) of mercury. In the conventional, ultra low pressure type operation, a large volume of material to be dried must be in the drying chamber to provide adequate output.

Still another object of the present invention is to provide a system of the type described wherein substantially no carrier, in either its gaseous or liquid state is lost from the system.

A further object of the present invention is to freeze dry with a minimum total energy input, either in the form of heat energy or mechanical (electrical) energy. A refrigeration system is required to condense the carrier gas into liquid and to freeze the water vapor into ice crystals. In the system embodying the invention, some of the energy required to operate the refrigeration compressor is recaptured by passing the hot refrigeration gas through an ice melter, wherein the refrigerant melts the ice crystals. The resulting water and the liquefied carrier are separated by gravity. The refrigerant also preheats and evaporates the liquefied carrier in a boiler, for reheating and recirculation of the carrier gas through the drying chamber.

The manner in which these and other objects of the invention may be attained will be apparent from the following detailed description of a method of and apparatus for carrying out the invention.

In the drawings:

FIGURE 1 is a schematic diagram of an apparatus embodying the invention.

FIGURE 2 is a graph showing how the thermal conductivity of the occluded gas, that of the solid material, and the total thermal conductivity, vary with pressure in the drying chamber, for a typical food product, such as peaches.

FIGURE 3 is a graph showing how the ability of the water vapor to flow through the shell of dried material varies with the pressure in the drying chamber.

FIGURE 4 is a composite graph of the total thermal conductivity, the mass transport coefficient of the water vapor, and the mass drying rate, at various drying chamber pressures.

FIGURE 5 is a graph showing the vapor pressure-temperature characteristics of water and several carrier fluids.

The most salient features of an apparatus embodying the invention will first be described. Referring to FIG. 1, the food product is placed in a drying chamber 10 through which a heated, non-toxic carrier gas, that is insoluble in water (such as heptane) is passed. The carrier gas supplies the heat of sublimation and sweeps the sublimed water vapor into a refrigerated condenser 20. Here both the water vapor and carrier gas are condensed. A slurry of ice crystals and liquid carrier pass on to an ice melter 30, wherein the water is gravity separated. The liquid carried from the ice melter and liquid carrier delivered directly from the sump of condenser 20 are conducted to a boiler 36, and revaporized by hot refrigerant. The carrier gas vaporized in the boiler is heated as it passes through a superheater above the boiler. The dry, hot carrier gas re-enters the drying chamber, and the freeze-drying cycle continues. Since the carrier gas is condensed at a lower pressure than its entry pressure, a head is established across the drying chamber, which eliminates the need for a circulating fan or blower.

Before proceeding with a detailed description of an embodiment of the invention, a résumé of some of the physical problems and considerations involved in freeze drying will be presented with special reference to the use of a carrier gas. There are two fundamental problems that relate to completing a freeze-drying process in a reasonably short drying time or cycle. These problems are:

(I) The problem of transferring heat to the ice core in the material.

(II) The problem of removing water vapor, as it sublines from the ice core.

The rate of water vapor removal must be high enough to keep the partial pressure of the water vapor over the ice core sufficiently low to prevent development of an excessive ice core temperature, and the resultant melting.

Each of these problems involves several factors which are outlined below. In some cases, optimizing one factor downgrades another, resulting in apparently incompatible parameters. As will be seen, the system of the present invention is operated in a pressure and temperature range that has been carefully selected while taking these conditions into consideration. Under the present invention the system is controlled in order to operate at substantially the most efficient compromise of what appear to be incompatible criteria, to produce substantially the optimum mass drying rate. The factors I and II, given above, will now be explained in detail, in order to facilitate the understanding of the significance of the operating ranges that have been selected, in accordance with the present invention.

(I) HEAT TRANSFER TO THE ICE CORE IN THE MATERIAL (a) *Effect of ice core temperature*

The lower the ice core temperature, the greater the heat transfer to the ice core, because the rate of heat transfer between two bodies is a function of their temperature difference. Thus, the colder the ice core, that is, the lower its temperature is relative to the temperature of the carrier gas, the greater will be the heat transfer from the carrier gas to the ice core. This criterion would call for maximizing the carrier gas temperature and minimizing the ice core temperature, but in the system of the present invention, the setting of other operating conditions determines the ice core temperature. Therefore, and as will be seen, in the system of the present invention, it is unnecessary to attempt to control the ice core temperature directly.

(b) *Effect of temperature of the surface of the dried material shell*

The higher the surface temperature of the shell of dried material that surrounds the ice core, the greater will be the heat transfer by conduction through the material itself to the ice core. The exterior surface temperature of the shell of dried material that surrounds an ice core is primarily a function of the temperature of the carrier gas, as it passes through the drying chamber. Thus, in the system of the present invention, the surface temperature of the dried material is controlled by adjusting the temperature of the carrier gas. However, the temperature of the shell of dried material must be kept below the temperature that will scorch the dried portions of the product, so that the maximizing of carrier gas temperature referred to above, has extrinsic limitations.

*(c) Effect of thermal conductivity of the composite intervening dried shell and occluded vapor, on heat transfer to the ice core*

In the system of the present invention, the heat of sublimation must be supplied by the transfer of heat from the carrier gas to the ice core. This transfer from the stream of carrier gas sweeping over the exterior of the shell to the ice core, takes place through two paths. One path is by way of conduction through the solid material of the intervening composite shell of dried material, to the ice core. The other path is one whereby heat is transferred by conduction through the gas mixture held in the cells, pores, capillaries, or matrix of the shell of dried material. This occluded gas mixture comprises the water vapor sublimed from the ice core, and carrier gas which has diffused into the shell. This transfer of heat is from the occluded gas to a cell, pore or capillary wall; from that wall to gas occluded in the adjacent pore; onto an opposite wall of the pore; and so on, until the heat is transferred to the ice core. The total thermal conductivity is the sum of these two effects.

With cellular material such as fruits, vegetables, meat or the like, or with porous materials such as dried coffee concentrate, the major portion of the volume of the shell of dried material that surrounds the ice core is occupied by this occluded gas mixture. The effect is the same, whether there be pores or cells, and the more general terms "porous" and "pores" will be used in the claims. When the system is operated in the pressure range found most suitable in the freeze drying of food products or the like, in accordance with the present invention using n-heptane as the carrier gas, approximately 54% of the net thermal conductivity of this composite shell of material and occluded gas is accounted for by the transfer of heat through the occluded gas within the pores of the material. The corresponding figure for fluorochemical (FC–75) is 50%, and other fluorocarbons give similar results. As mentioned, since the shell of dried material always has one portion thereof in contact with the ice core, the total thermal conductivity also includes the effect of direct transfer of heat from the external stream of carrier gas, through the solid material itself, and onto the ice core.

Reference is made to FIGURE 2, which includes a curve showing the total thermal conductivity K of a porous or a cellular food material, including the effect of the thermal conductivity of an occluded gas (heptane), at various pressures, and at the temperatures involved in the process. FIGURE 2 also presents curves showing the indivdual contribution of the gas, and the individual contribution of the solid, to the total thermal conductivity curve.

Referring to the curve of FIGURE 2, at pressures less than 0.1 mm. Hg the contribution of the gas is low, but as the pressure increases above this point the contribution of the gas increases rapidly. This can be explained as follows: When the pressure of occluded gas is very low, the number of molecules of gas that occupy a given volume (such as a pore or capillary of the food) is correspondingly low. Under these conditions, the mean free path of the molecules between intermolecular collisions, is larger than the diameter of the pores. According to kinetic theory of gasses, the thermal conductivity is proportional to the product of the gas density and the mean free path. In this case, where the mean free path is held constant by the pore or cell wall, the thermal conductivity of the gas is proportional to the gas density, which in turn is proportional to the pressure. This is shown on the "contribution of gas" curve of FIGURE 2 as the essentially straight portion of the curve, to the left and below point "x." Note that when the straight line portion of the contribution of the gas curve to the left of point "x" is added to the constant value contribution of the solid, the straight line relationship is lost in the resulting plot of total thermal conductivity.

It is well known from the kinetic theory of gasses, that the thermal conductivty of gas is independent of pressure, if the mean free path of the molecules is small compared to the dimensions of the confining space. In the present case, at higher pressures (above approximately 30 mm. Hg), the number of molecules that occupy a pore of the food is greatly increased, so that collisions between molecules dominate, as opposed to collisions between molecules and the pore walls. Under these circumstances, the mean free path of the molecules is small compared to the diameter of the pore, and the thermal conductivity remains or becomes constant with further increases in pressure. This condition is shown on the "contribution of gas" curve of FIGURE 2 as the essentially constant value portion of the curve to the right of point "y".

Between point "x" and point "y" is a transition zone, in which the relationship between the thermal conductivity contribution of the gas and the pressure, changes from one of direct proportionality to one of constant conductivity with changing pressure. This gradual transition is the result of variations of the pore size in the dried material, so that there is no single pressure at which the mean free path becomes equal in magnitude to the pore diameter. In addition, the phenomena known as "temperature jump," which is manifested by a finite difference in temperature between the solid surface and the gas immediately adjacent to the surface, becomes noticeable when moving from high pressures to a lower pressure. The "temperature jump" results in an apparent decrease in thermal conductivity when moving to lower pressures within the transition zone.

The total thermal conductivity curve of FIGURE 2 is the algebraic sum of the gas contribution and solid contribution curves. The shape of the sinuous section of the curve that has a positive second derivative, that is, the section from about 0.01 to 1.0 mm. of Hg, is well below the range of operation. The shape of this section results simply from the algebraic addition of a straight horizontal line and a sloping substantially straight line on a logarithmic ordinate, and here the effect of direct conduction dominates. However, the other curved section of the curve, namely, the section between about 2.0 to 30 mm. of Hg, has physical significance relative to the cell or pore size, and the mean free molecular path, as explained.

To summarize, these relationships of pressure to thermal conductivity may be understood by considering how the mean free path and the number of collisions of gas molecules vary with gas pressure. At extremely low pressures, there are few intermolecular collisions and the molecules of gas collide primarily with the cell, pore, or capillary walls of the porous material. The mean free path of the molecules is limited to the average dimension of the interstices or pores wherein they are contained. However, the number of molecules is so small that the thermal conductivity due to the occluded gas is negligible.

As the pressure is increased, a point is reached (adjacent point "x," FIG. 2) wherein the number of molecules colliding with this solid matrix increases substantially in direct proportion to the increase in pressure. When the pressure is increased to a value of several mm. of Hg (in the transition zone, FIG. 2), a substantial number of intermolecular collisions begin to take place. In this pressure region (the zone in which the system is operated), the behavior of the gas undergoes a gradual transition to the behavior it exhibits at still higher pressures, above point "y," when the dominating type of collisions is intermolecular, as opposed to collisions with the containing solid. As the pressure continues to rise (above the zone of point "y," FIG. 2) intermolecular collisions dominate, and in fact, at pressures not too far beyond this region, the thermal conductivity remains constant, it no longer increases as pressure increases.

As seen in FIGURE 2, the total thermal conductivity of dried food products exhibits a relatively low, substantially constant value (0.009) at pressures below 0.01 mm. Hg, and it exhibits a second substantially constant value (0.0194), that is 2.15 times higher than the first substantially constant value. This second substantially constant value occurs at pressures above, say 30 mm. Hg. In accordance with the present invention, there is an important transition zone between these two pressures, namely, the zone between about 2 and 30 mm. of Hg, in which the lowest value of the total thermal conductivity K (using heptane carrier gas), is still relatively high (over 0.15 unit), and wherein K increases from this lower value almost up to its maximum attainable value of 0.0194 unit. The lower operating range of 2 mm. Hg is selected because it represents the lower end of the transition zone. Below a pressure of about 2 mm. Hg, the thermal conductivity drops off rapidly in a substantially straight line relationship.

When all of these factors are optimized, it will be found that considering thermal conductivity alone, in the case of foods such as beef, vegetables, fruit, etc., there is a total vapor pressure (as low as 5–15 mm. of Hg, and perhaps up to about 30 mm. of Hg) wherein the thermal conductivity is almost at its maximum. Above 30 mm. of Hg, the rate of increase of thermal conductivity with pressure drops off so rapidly that nothing is gained by going to such higher pressures.

Also, in accordance with the present invention, consideration is taken of the fact that as the water vapor pressure increases, so does the temperature of the ice core, it being understood that the ice core temperature will adjust itself to the vapor pressure to which it is subjected.

The liquid in the food is usually a solution, and so the eutectic temperature point of such liquid is lower than the temperature corresponding to the triple point of water. It is usually not commercially feasible to operate below the eutectic temperature, so the partial pressure of the water vapor will be maintained between the eutectic and the triple point temperatures, at a point which reduces to an acceptable extent the amount of liquid solution that remains in the material during drying. When drying is actually completed, the material will be bone dry, and the very small amount of water in the solution that was present will have evaporated.

As is evident from FIGURE 2, the thermal conductivity K can be controlled by controlling the pressure within the drying chamber, and over the range discussed, the thermal conductivity is increased as the pressure in the drying chamber is increased.

It will also be mentioned that the heat carrying capacity of the carrier gas itself, as it sweeps across the product, varies directly with its density, and hence with its pressure. Therefore, in addition to poor thermal conductivity at very low pressures, the carrier gas, itself, has a low heat carrying capacity per unit volume at such low pressures. In the operating pressure zone employed in the present invention, the thermal conductivity of the carrier gas is relatively high.

(II) REMOVAL OF WATER VAPOR FROM THE MATERIAL

(a) Effect of ice core temperature

The rate of water vapor removal increases as the temperature of the ice core increases. As the temperature of the ice core increases, the vapor pressure of the ice also increases, increasing the driving force for moving the vapor away from the ice core, and hence increasing the rate of water vapor removal. It will be noted that the effect of this phenomenon relative to the advantages attained, is incompatible with item I(a), wherein an increase in ice core temperature lowers heat transfer to the ice core, and hence works to a disadvantage.

However, as previously mentioned, in operation of the system of the present invention, ice core temperature is determined by the selection of other operating parameters. In any case, the partial pressure of the water vapor is held low enough, that is, between the eutectic and the triple points, to insure that ice core temperature does not become high enough to result in melting of the ice.

(b) Effect of water vapor concentration at the surface of the dried material shell The concentration of water vapor at the surface of the dried material shell, which material intervenes between the product surface and the ice core slows down further sublimation of water vapor from the ice core. Water molecules leave the ice core by sublimation under statistical laws, and by the same laws, molecules from the surrounding water vapor may also re-enter the ice core. The re-entry effect is increased as the concentration of water vapor at the surface of the material increases.

It will be recalled from the laws of physics, that the relation of the intrinsic vapor pressure over ice at a given temperature, to the actual water vapor pressure that may be present is a factor that determines the rate of sublimation. Water vapor molecules are both leaving and re-entering the ice core, and these changes in molecular phase balance at equilibrium conditions, that is, when the two vapor pressures are equal. This sublimation action at the ice core surface is unaffected by the coexistant partial pressure of the carrier gas molecules. The preferred carrier gas, n-heptane, is immiscible with water, and will not dissolve in ice, so that the two gasses (or vapors, if that term is preferred) act independently relative to the initiation of the sublimation process.

The concentration of water vapor at the surface of the shell of dried material can be controlled, and in fact is brought to a very low figure in the present invention, by manipulation of the carrier gas temperature and flow. The "drier" the carrier gas, that is, the lower its relative humidity, the more effective the carrier gas will be in lowering the concentration of water vapor at the surface of the shell of dried material. The rate of sublimation from the ice core will be correspondingly increased.

(c) Effect of the mass transport coefficient of the water vapor through the composite intervening dried material, and its occluded gas If all the other factors are ignored, drying time is reduced as the mass transfer coefficient of the water vapor is increased. The mass transfer coefficient includes the effects of both diffusion flow (or motion) of water vapor molecules from the surface of the ice core and through the intervening shell of dried material and occluded carrier gas, and the hydrodynamic flow of the molecules over the same paths. The extent to which each of these individual effects contributes to the over-all mass transfer coefficient cannot be simply expressed. The net effect is proportional to the difference between the water vapor pressure at the ice core, and the total pressure in the drying chamber, which pressure difference establishes the "driving force" for water vapor transport away from the ice core. However, the effect of a given "driving force" is itself related to the physical properties of the material being dried, and to the properties of the carrier gas, such as its molecular weight. As the pressure of the carrier gas or vapor occluded in the pores of the material being dried decreases, the more readily the water vapor molecules that have sublimed from the ice core can travel across the pores of the dried material, and on through the porous walls, to the surface of the material, where they can be swept away by the carrier gas.

Reference is made to the graph of FIGURE 3 which is largely self-explanatory. As seen in FIGURE 3, there are two distinct phases in the mass transport coefficient curve. At pressures below about 0.2 mm. of Hg, the mass transport coefficient D holds constant at its maximum value.

At pressures above approximately 2 mm. of Hg, the mass transport coefficient decreases as pressure increases. There is a transition zone, which occurs approximately between pressures of 0.2 to 2 mm. of Hg, which connects the two previously mentioned zones.

As in the case of thermal conductivity, the mass transport coefficient can be controlled by controlling the pressure in the drying chamber. The lower the pressure, the higher the coefficient, and the greater is the rate of water vapor flow from the ice core, across the pores, and into the carrier gas stream. As indicated in FIG. 3, the zone of operation under the present invention is between the upper pressure limit of the mass transport coefficient transition zone (about 2 mm. of Hg), and a pressure of about 30 mm. of Hg. As indicated in FIG. 2, the lower of these pressures (2 mm. Hg), corresponds to the lower pressure of the thermal conductivity transition zone. The higher pressure is the pressure wherein the thermal conductivity K (FIG. 2) has substantially leveled off.

Comparison of FIGS. 2 and 3 reveals that in the zone of operation of the present invention, as the total vapor pressure is decreased from the higher operating pressure of 30 mm. Hg to the lower pressure of 2 mm. of Hg, the mass transport coefficient increases by several hundred (about 800) percent, whereas the corresponding decrease in thermal conductivity is only something over 20%. In the present invention, the mass transport coefficient in the zone of operation indicated in FIG. 3 is adequate to release the water vapor liberated as a result of the heat supplied to the ice core, in accordance with the principles discussed relative to thermal conductivity.

It is now possible to explain how the various operating parameters are correlated in accordance with the teachings of the present invention. In comparing the three factors listed under (I) Heat Transfer to the Ice Core, and (II) Removal of Water Vapor from the Material, as mentioned, the factor ($a$) in each case, namely the effect of ice core temperature, is not directly subject to control once the process begins, and so cannot be independently adjusted for shortening drying time. This is because ice core temperature during drying is uniquely determined by the heat and mass transfer equations pertaining to the system, once the factors ($b$) and ($c$) under headings I and II above have been fixed.

Items ($b$) under both of the main headings (I) and (II) are readily controlled, and are not incompatible. These items are, the temperature of the shell of dried material, and the water vapor concentration at the shell surface. These items, can be optimized by adjusting the temperature of the carrier gas, its rate of flow, and its degree of dryness; so that in the present invention a selection of the carrier gas characteristics that provides advantages in connection with one of the factors of items ($b$) referred to above, also provides advantages relative to the other factor.

Items ($c$) under heading (I) Heat Transfer to the Ice Core, and heading (II) Water Vapor Removal, can be seen to be generally incompatible. These items are, the thermal conductivity of the occluded gas in the shell of dried material, and the mass transport coefficient of sublimed water vapor, through the composite shell and its large volume of occluded gas.

As previously described, if the pressure in the drying chamber is increased from a low value (such as a one or two millimeters of mercury) to a higher value (such as 30 mm. of Hg), the thermal conductivity of the composite intervening dried portion of material and the occluded gas increases, and then substantially levels off.

Conversely, as the pressure in the drying chamber increases over the same range, the mass transport coefficient of the water vapor from the ice core, through the intervening composite dried shell of the material and occluded gas, and to the surface of the material for entrainment by the carrier gas, decreases, but remains sufficiently high.

In the case of mass transport coefficient, the increase in pressure, instead of being of assistance, as it is in the case of the thermal conductivity factor, becomes a hindrance. In fact, at atmospheric pressure, the mass transport effect referred to has such a small value, that even if the carrier gas could sweep away all water vapor from the shell surface, and thus maintain zero water vapor pressure at the surface of the dried material, there would be such a slow mass transport rate of vapor sublimed from the ice core to the surface of the dried material, that the drying time would become unacceptably long.

It must also be recognized that the heat carrying capacity per unit volume of the gas increases with increasing pressure, and at very low pressures, large volumes of carrier gas must be circulated in order to supply the heat of sublimation.

As mentioned, and in accordance with applicant's invention, these apparently incompatible features are substantially optimized, by selecting an operating pressure within the drying chamber, in a pressure zone wherein the thermal conductivity curve exhibits its transitional zone, namely a pressure zone wherein the mean free path of the carrier gas molecules are of the same general order as the mean dimensions across the pores, cells or capillaries of the material matrix. Any further increase in the carrier gas pressure does not help transfer heat from the exterior surface of the dried material shell to the ice core.

Reference is made to the composite graph of FIGURE 4. This graph superimposes the thermal conductivity and mass transport curves discussed above, and adds a curve showing the resulting mass drying rate W, for a typical food product such as peaches. It will be noted that the overall operation zone or range, previously referred to, includes the hump of the mass drying rate curve. However, in accordance with the present invention, a typical operating range of pressures is much smaller, being 5.67 to 11 mm. of Hg in the example given. This range substantially coincides with the optimum mass drying rate zone on the curve. In this pressure range, the mass transport effects are still substantial enough (although rapidly decreasing with increasing pressure) so that water vapor sublimed from the ice core will reach the surface of the dried material for entrainment by the carrier gas, at a rate that provides a short drying time. As previously stated, if sufficient heat for sublimation has reached the ice core, once the water vapor does reach the surface of the material there is no problem, because the carrier gas can readily be controlled to sweep such water vapor out of the drying chamber. The partial pressure of the water vapor never exceeds about 1.3 mm. of Hg, which is well below the triple point pressure, so that sublimation takes place.

Prior proposals to use a carrier gas have circulated the gas through the system at a relatively high total pressure, such as at atmospheric pressure. Under these conditions it can be seen from FIGS. 3 and 4 that the mass transport characteristics of the water vapor through the gas occluded in the intervening dried material are so low, that even though the surface of the material being dried is swept clear of water vapor by the carrier gas, there is not enough water vapor removed from the region of the ice core, and enough additional water vapor cannot be sublimed from the ice core through the intervening shell of dried material, to render the process practical. Such systems require an unacceptably long drying time.

On the other hand, if prior systems of the noncondensible carrier gas type were to be operated at total pressures low enough to provide an acceptable mass transport of water vapor through the intervening shell of dried material, then the velocity and volume requirements placed upon the carrier gas pumping system would be very high, which again would render the operating cost of the system economically unfeasible.

The optimum operating zone, in terms of the rate of water vapor removal, is that pressure region wherein the pressure is high enough to provide a relatively high thermal conductivity with attendant high rate of heat transfer to the ice core; but the pressure is not high enough to decrease the mass transport sufficiently to excessively inhibit the flow of water vapor from the ice core and through the shell of dried material; and the process is carried out without raising the temperature of the ice core sufficiently to produce a commercially objectionable amount of unfrozen, concentrated solution of solids and water during the drying process. As mentioned, this very small amount of solution that develops is also evaporated during the drying cycle.

As has been indicated, the zone of operation, in terms of pressure range may be defined as the transition zone of the thermal conductivity curve of the carrier gas at the temperatures involved as illustrated in FIGURES 2 and 4, and this is the meaning of the term "Transition Zone" when employed in the claims. This zone may also be defined as the pressure range wherein the mean free path of the gas molecules, and the average dimensions of the pore, cell or capillary walls are substantially equal, or are of the same order.

The operating pressure zone can be still further described as the zone wherein the thermal conductivity is as high as possible, and yet the pressure is not so high as to prevent flow of water vapor out of the matrix to a degree that the maximum permissible ice core temperature is exceeded.

The basic criteria and parameters discovered as determinative of operation under the present invention having been explained, reference is now made to FIGURE 1, which is a schematic diagram of the essential elements of a batch type freeze drying system for carrying out the present invention.

GENERAL DESCRIPTION OF THE APPARATUS

Referring to FIGURE 1, the product to be dried is placed in the drying chamber 10, the details of which do not form part of the present invention. In the case of vegetables, mushrooms or the like, the product is diced or otherwise formed into relatively small pieces. In the case of meats the product is diced or is introduced in the form of patties, or relatively thin cuts, in the usual manner. In the batch type system illustrated, the usual sealed door 12 is provided for loading and unloading the product. Before being placed in the drying chamber, the product is distributed on mesh trays 14, which are usually horizontally disposed, and which provide for the passage of gas through the product and the bases of the trays. The product to be dried, indicated generally at 16, will have been previously frozen in conventional commercial type freezing apparatus, the details of which do not form part of the invention.

An outlet duct 18 connects the drying chamber 10 to the condenser 20, the condenser being provided in order to condense and liquify the carrier gas HV, and freeze the entrained water vapor WV into ice crystals X. As previously mentioned, the carrier gas HV employed in the embodiment of the invention being described, is heptane vapor when in its gaseous state. Associated with the main vapor condenser 20 is a refrigeration system indicated generally at R. The system includes the usual compressor 22, wherein the refrigerant gas is compressed and conducted by a hot refrigerant line 24 to a coil 28 within an ice melter 30. The ice melter 30 serves as a first stage refrigerant condenser, and supplies the heat necessary to melt the ice crystals X, formed in the drying process.

An outlet line 34 conducts hot refrigerant from the ice melter coil 28 to a boiler 36, wherein the liquified heptane carrier HL is evaporated into its gaseous or vapor phase HV. This evaporation is effected by an evaporating coil 38 that is corrected to the line 34, and coil 38 is submerged within the liquid carrier HL in the boiler 36. A refrigerant outlet line 40 leads from the heptane evaporator coil 38 to an expansion valve 42, and the cooled and condensed refrigerant leaving the expansion valve 42 expands within refrigeration coils 44, mounted in the upper part of the main vapor condenser 20. The refrigerant, which is now gaseous, is returned to the compressor 22 from the condenser coils 44, by a suction line 46.

In order to clear the refrigeration coils 44 of accumulated ice crystals, a coil sprayer pump 50 is provided, which has an inlet line 51 that receives liquid heptane carrier HL from the condenser sump. The pump outlet connects to a manifold 52 that overlies the refrigeration coil 44. This manifold is provided with small nozzles or orifices, so that the liquefied carrier HL withdrawn from the sump portion of the condenser by pump 50, is sprayed over the refrigeration coil 44, to loosen and wash off ice crystals X deposited thereon. At the bottom of the condenser, a stirrer 54 is provided, driven by a gear reduction motor device 55. This stirrer 54 not only agitates the slurry of ice and liquid heptane but acts as a pump to urge the slurry through a line 56 into the ice melter 30. If required, a pump (not shown) could also be placed in line 56, to transfer the slurry to the ice melter more positively. The water W formed in the ice melter by the heat supplied from the refrigerant condensing coil 28 is pumped up to atmospheric pressure, and discharged by a water discharge pump 58, having its inlet connected to the ice melter 30.

A primary liquid heptane carrier line 60 leads from the upper portion of the sump of the main vapor condenser 20, and joins a secondary liquid carrier line 62 leading from the upper portion of the ice melter 30. Lines 60 and 62 join to form a common liquid carrier line 64, which leads to the carrier boiler 36 in a zone below the boiler coil 38.

The head "$h$" between the level of the liquid in the vapor condenser 20 and the liquid in the boiler 36 is made equivalent to the difference between the pressure in the boiler and that in the condenser. As will be seen presently, the head "$h$" represents a pressure difference of 5.83 mm. Hg, which corresponds to a head of 4.56 inches of liquid heptane.

In the ice melter 30, the interface between the liquid heptane and the water must be maintained at a level that is low enough to prevent water from reaching line 62 leading to the boiler 36, and yet the level must be maintained high enough to prevent heptane from reaching the pump 58. This is accomplished by use of a level control device and a solenoid valve 65 in line 60.

The level control device is illustrated diagrammatically. It provides a sensor unit 66 having a high level and a low level capacitance electrode or probe, and a controller 67. The controller has a section that operates the valve 65, and one that turns the pump motor for pump 58 on and off. When the heptane-water interface drops to the low level electrode, the pump 58 is shut off, and valve 65 is opened, to increase the outflow of heptane in line 62. This permits more slurry to enter the ice melter and the interface rises.

When the interface reaches the high level electrode of sensor unit 66, valve 65 is closed and the pump 58 is started, which brings the level of the interface down again. Level controls of the type described are manufactured by Fielden Electronics, Inc., Huntington, N.Y. and sold to the trade as their "Tektor" Level Control. The details of the level control form no part of the present invention, and so are not described.

The head $h1$ between the liquid level in the vapor condenser 20, and the top of the liquid heptane in the ice melter 30, need only be sufficient to prevent vaporization of the heptane in the ice melter. At 40° F. this head corresponds to a pressure of 20 mm. Hg. Since, as will be seen presently, the total vapor pressure in the vapor condenser 20 is 5.67 mm. Hg, the head $h1$ referred to should be 11.1 inches for a carrier liquid having the density of heptane.

In order to remove air and other non-condensible gases that might be entrained in the system, or that might leak into the system during drying, a cold trap system 70 is provided at the condenser 20. The cold trap 70 is in the form of a closed vessel which has an inlet line 72, leading from the upper wall of the condenser 20. A vacuum pump 74 is connected to the vessel of the cold trap, for removing non-condensible gases, such as air. In order to recover any uncondensed carrier gas vapor drawn up by the pump 74, the cold trap is refrigerated by a coil 76, which is connected to a refrigeration unit (not shown), these details forming no part of the invention. Condensed carrier gas and water vapor (if any) are returned from the cold trap to the condenser 20, by a return line 78.

Returning to the boiler 36, directly above the boiler is a carrier gas superheater 80, wherein the vaporized carrier gas HV is superheated by steam coils 82, disposed within the superheater chamber. Steam is supplied at the temperature necessary to impart the desired superheat to the vaporized gas HV, under control of a steam valve 83. The dry, superheated carrier gas is conducted from the superheater 80 to the inlet of the drying chamber 10 by a duct 84. The duct 84, and the other parts of the apparatus will be supplied with insulation such as the lagging 86 shown in fragmentary form on the duct 84. This lagging and all other insulation that might be required, have been omitted from the diagram of FIGURE 1 for clarity.

In order to conserve carrier gas remaining in the drying chamber, and in ducts 18 and 84 during loading and unloading, isolating valves 90 and 92 are provided. A cold trap 94 connects to return duct 84 through a line 96 and a valve 98. A vacuum pump 100 removes air and non-condensible gasses. A refrigerated coil 102 liquefies condensible gasses, which liquids leave the cold trap 94 through a return line 104. A valve 106 directs the condensed liquid either to the condenser 20 by a line 108, or discharges it by a line 110.

GENERAL OPERATION OF THE APPARATUS

The general operation of the system embodying the invention will now be described.

The criteria considered in the selection of a carrier gas (or liquid) for the operation of a freeze drying system wherein food products are being treated, will be presented in some detail later in the specification. At the moment, it will be sufficient to state that the carrier employed in the embodiment of the invention being described is heptane, the physical characteristics of which will be briefly mentioned presently. In the embodiment described, the heptane carrier is n-heptane (normal heptane).

PRELIMINARY PROCEDURE

The valves 90 and 92 will have been closed at the end of the previous drying cycle, and after the product has been loaded in the drying chamber and the door closed, the first step in process is the removal of air from the drying chamber and connecting ducts. To accomplish this, the cold trap valve 98 is opened, and the vacuum pump 100 started up and run until substantially all of the air trapped between the valves 90 and 92 has been exhausted. This will involve removal of some water vapor that is formed during the scavenging process, but if desired, the water vapor may be condensed in the cold trap 94. When scavenging is complete, the cold trap valve 98 is closed, and vacuum pump 100 is shut down. Valves 90 and 92 in the carrier gas ducts can now be opened. To start a new drying cycle, the refrigeration unit R is started, and when the valve 83 controlling the steam supplied to the superheater is turned on to admit steam, the system is ready for operation.

The carrier gas cycle

The cycle of the carrier will now be traced, beginning at station H of duct 84, at the entrance to the drying chamber. The conditions at this section of the duct 84 are substantially the same as those along the entire duct. The states and conditions of the carrier, and the water at various stations in the apparatus appear in Table I, which is based on 100 lbs. per hour water removal. Table I can be considered to represent conditions at the start of the cycle in a batch process, or the average conditions that occur in a continuous process.

TABLE I—SYSTEM CONDITIONS
[Based on 100 lb./hr. water removal]

| Station | Temp., °F. | Pressure, mm. Hg | | Total Pressure, mm. Hg | Flow Rate, Lb./Hr. | State | |
|---|---|---|---|---|---|---|---|
| | | Heptane | Water | | | Heptane | Water |
| A | 6.0 | 4.36 | 1.31 | 5.67 | 1,980 | Vapor | Vapor |
| B | 5.0 | Of no significance | | | 1,780 | Liquid | |
| C | 5.0 | Of no significance | | | 200 | Liquid | Solid |
| D | 32.0 | Of no significance | | | 100 | | Liquid |
| E | 32.0 | Of no significance | | | 100 | Liquid | |
| F | 6.8 | Of no significance | | | 1,880 | Liquid | |
| G | 32.3 | 11.5 | | 11.5 | 1,880 | Vapor | |
| H | 161.3 | 11.0 | | 11.0 | 1,880 | Vapor | |

At station H, the hot, dry heptane vapor is at 161.3 degrees F., and at a pressure of 11 mm. of mercury. After steady flow conditions of the carrier vapor have been attained, which conditions are attained early in the cycle, the vapor leaving the drying chamber at station A, is a mixture of cold heptane vapor HV, and water vapor WV. At this station, the temperature of the vapor mixture is 6° F., and as seen in Table I, the total pressure is 5.67 mm. of mercury. This establishes a head across the drying chamber and between stations H and A, of over 5 mm. of mercury, which supplies the pumping force necessary to circulate the carrier gas and water vapor through the drying chamber. The average pressure in the drying chamber is approximately 8 mm. of mercury.

As the carrier gas passes through the drying chamber, it supplies the heat of sublimation to the material being dried and to the ice core, and the ice core is sublimed due to thermal conduction, and diffusion of water vapor away from the ice core, as previously described. The carrier gas also picks up and sweeps away the water vapor which has sublimed from the ice core, and has diffused to the surface of the shell of dried material.

The food in the upper portion of the drying chamber is the first exposed to the hot carrier entering the chamber and is the first food to dry. As the drying process progresses, there will be a layer of dried material at the top of the drying chamber which will have been heated to the same temperature as the entering carrier gas. Below the layer of dried material will be the "drying zone" in which heat is transferred from the carrier gas to the ice core of the frozen product, while the sublimed water vapor is swept away by the carrier gas. Toward the bottom of the drying zone the carrier will have cooled considerably and will be mixed with a large percentage of water vapor. In this area the mass drying rate of the food particles will be slower, since the temperature difference between the surface and the ice core will be less so that heat transfer to the drying core will be slower. The water vapor diffusion from the ice core to the surface will also be slower, since there will be less difference in water vapor pressures between the ice core and the surface. At the bottom of the drying zone, the carrier and the water vapor will have cooled to the temperature of the frozen products and the partial pressure of the water vapor will equal the vapor pressure of the ice in the frozen product. Below the drying zone no drying will take place and the product will remain frozen until the drying zone moves down to it. During the drying cycle, the drying zone moves progessingly from the upper to the lower portion of the drying chamber, whereupon the drying process will have been completed. The food or other product being dried, provides a restriction to flow of the carrier, so that the head of over 5 mm. of mercury can be maintained during the drying cycle.

As the cold, wet mixture of carrier gas and water vapor enters the condenser 20, it flows over the cooling coil 44, whereupon the heptane vapor condenses to its liquid state HL, and the water vapor is frozen, to form ice crystals X. The liquid carrier falls to the sump portion of the condenser 20, to form a body of liquid heptane HL. The ice crystals X are washed free of the coils by the spray of liquid heptane from manifold 52, and being heavier than the liquid heptane HL, the ice crystals settle by gravity to the bottom of the condenser. The stirrer or agitator 54 driven by the gear reduction unit 55, keeps the ice crystals in a fluidized state, in order that the slurry of ice crystals and liquid carrier can flow into the ice melter 30.

As previously mentioned, in order to remove air and other non-condensible gasses that leak into, or were trapped in the system, the vacuum pump 74 and cold trap 70 are kept in operation during the drying cycle. Any carrier gas, and any water vapor that are drawn into the cold trap, are condensed therein by the refrigeration coils 76, and returned to the condenser by line 78.

As mentioned, flow from the vapor condenser 20 is divided into two streams. The liquid heptane flows directly from an upper portion of the sump of the vapor condenser 20 through line 60, and joins heptane leaving the ice melter in line 62, as previously described. Lines 60 and 62 join to form line 64 which conducts the liquid heptane to the boiler 36.

In the ice melter, the refrigeration coils 28 melt the ice crystals X into water W, and the water is pumped up to atmospheric pressure and discharged by the pump 58. The level control system maintains the heptane-water interface in the ice melter between the sensing electrodes of sensor unit 66, as described.

The body of liquid heptane HL in the boiler is vaporized by the hot refrigerant in coil 38, to form heptane vapor HV. The conditions of this vapor at station G are given in Table I, and it is seen that the heptane vapor is at a temperature of 32.3° F. and at a pressure of 11.5 mm. of mercury. The heptane vapor HV is superheated by the superheat coils 82, as previously described, to bring it back to the conditions of station H, wherein the vapor is at a temperature of 161.3° F., and at a pressure of 11 mm. of mercury.

The above described circulation of a condensible carrier gas, followed by its condensation and reevaporization, imparts heat to the ice core in the product, and sweeps away the resulting sublimed water vapor, all without requiring a blower. The efficiency of this process is such that drying time is greatly reduced from that of the conventional high vacuum type freeze drying operations. For example, in an installation embodying the invention, a one-inch thick layer of frozen food such as peaches or peas, can be dried in less than one hour, as compared to conventional high vacuum freeze drying of the same starting materials, which require 6–9 hours for drying.

The refrigeration cycle will again be briefly retraced. The refrigerant expands at the expansion valve 42 into coil 44 in the vapor condenser 20. The refrigerant picks up the heat of vaporization of the heptane vapor and the heat of sublimation of the water vapor in coil 44. The expanded refrigerant enters the compressor through line 46, and the hot, compressed refrigerant flows through line 24 to the ice melter 30. As mentioned, in the coil 28 of the ice melter, the refrigerant supplies the heat necessary to melt the ice crystals X into a body of water W. The refrigerant enters the boiler 36 through line 34, whereupon by means of coil 38, the refrigerant supplies the heat of vaporization of the liquid heptane HL, which is reconverted into heptane vapor HV. The cooled liquid refrigerant leaves the boiler by line 40, and passes through the expansion valve 42, whereupon the refrigerant re-expands in the condenser coil 44, to freeze the water vapor and ice crystals, and condense the carrier into its liquid state HL, as previously described.

When the drying cycle has been completed, the refrigeration unit is shut off, the steam supply to the superheater is shut off, and valves 90 and 92 are closed. Operation of valves 98 and 106 and cold trap 94 makes possible the scavenging of ducts 18, 84, and the drying chamber of residual carrier, and returning the condensed carrier to the condenser. The dried product can now be removed from the drying chamber after the vacuum has been broken.

If a continuous process is employed, using the usual air locks and traps at the product entrance and removal portions of the drying system, the valves 90 and 92 need not be provided.

*Carrier gas.—Essential characteristics for direct phase separation*

(1) When food products are dried, if there is any carrier residue absorbed by the product, the residue should be non-toxic in the amounts present.

(2) The carrier must be non-reactive (inert) with the material being dried, and with water for direct phase separation.

(3) The carrier must have an intrinsic vapor pressure at the temperature of the ice core in the material, that is higher than its existing partial pressure in the drying chamber during operation, at the ice core temperature. This prevents condensation of the carrier gas in the drying chamber.

The carrier which is used in the system that has been described is normal-heptane. Its vapor pressure is listed by the Handbook of Chemistry and Physics (Chemical Rubber Publishing Co., Cleveland, Ohio) as follows:

| Pressure, mm. Hg | 1 | 10 | 40 | 100 | 400 | 760 |
|---|---|---|---|---|---|---|
| Temperature (Appr.) ° F | −30 | +28 | 72 | 107 | 172 | 209 |

The specific gravity of liquid n-heptane is 0.684, at 68° F. (20° C.), as compared to water at 39.2° F. (4° C.).

*Carrier gas.—Desirable characteristics*

(1) It should be non-flammable.

(2) It should have an intrinsic vapor pressure at the temperature of the ice core in the material that approaches its actual, or operating partial pressure at the ice core temperature as closely as possible. However, as mentioned previously, these pressures should not be so close as to present the possibility of the carrier gas dropping to its intrinsic vapor pressure at the ice core temperature, due to a variation from the design operating conditions which might occur due to minor irregularities of operation. If the carrier gas temperature dropped too far, the carrier gas would condense in the drying chamber.

FIGURE 5 is a graph comparing the vapor pressure-temperature characteristics of heptane, with those of water. It will be seen that the heptane curve follows that for water rather closely, but is displaced upwardly from the water curve on the temperature scale. This displacement represents a factor of safety during operation, which insures that the carrier will not condense in the drying chamber.

This characteristic, wherein the vapor pressure-temperature curve of the carrier is displaced upwardly from the corresponding curve for water, but is not displaced too far therefrom, improves the efficiency of the condenser. It permits operation of the vapor condenser without requiring extremely low temperatures therein. This, in turn, reduces the temperature differential between the liquefied carrier in the condenser, and the temperature to which the carrier must be raised in the carrier boiler. The result is a reduction in the amount of work done by the refrigerator compressor, in order to condense and re-evaporate the carrier gas.

(3) The carrier should have a relatively high ratio of specific heat (vapor phase), to its latent heat of vaporization.

As the specific heat of the carrier gas in its vapor phase increases, the required mass flow rate needed to supply the latent heat of sublimation decreases. It is desirable that the carrier have as high a specific heat as possible, but this should not be attained at the expense of having an unduly high latent heat of vaporization. The higher the heat of vaporization, the greater is the amount of heat circulated by the refrigeration compressor between the refrigeration evaporator (heptane and water vapor condenser) and the heptane boiler. An increase in this heat pump requirement requires more work on the part of the refrigeration unit.

Normal heptane in its gaseous state has a heat capacity of 0.38 B.t.u./lb. ° F. at 30° F., and has a latent heat of vaporization at 160 B.t.u./lb. at a pressure 12 mm. of mercury and at a temperature of 32° F., this being substantially the condition of the gas at the boiler, before it is superheated. The ration of specific heat to heat of vaporization referred to (times 100), is 0.237. The specific heat of the superheated heptane will be somewhat higher.

(4) The molecular weight of the carrier should be as low as possible. Given a certain mass flow rate through the drying chamber, an increase in the molecular weight of the carrier reduces the weight fraction of water vapor which the carrier will sweep away, at a given ice temperature and ice vapor pressure.

The result is, that the most desirable carrier optimizes the effects of the specific heat ratio referred to, and that of molecular weight. For example, n-heptane has a molecular weight of 100.2. Tests have been made using a fluorocarbon carrier, supplied by the Minnesota Mining and Manufacturing Co. of St. Paul, Minnesota, referred to as "Fluorochemical FC–75." "FC–75" is mostly perfluoro-2-butyl-tetra-hydro-furan, having the formula $C_8F_{16}O$. This material has a ratio (times 100) of specific heat (cal./gm./° C. at 110° C.) to latent heat of vaporization (cal./gm. at the boiling point), of $$\frac{.236}{37.8}(100) = 0.63$$

as compared to the same ratio (times 100) of $$\frac{.380}{160}(100) = 0.237$$

for n-heptane. This material is a colorless, odorless liquid. However, the molecular weight of the "FC–75" fluorocarbon referred to is 4 times that of n-heptane, and despite the more favorable ratio of specific heats, this increase in molecular weight of the fluorocarbon reduces the capacity of the carrier for sweeping away sublimed water vapor by about 30%, compared to the capacity of the heptane carrier. However, this fluorocarbon has the other essential and desirable characteristics of a carrier, and hence would be considered for use in the process, at the disadvantage of a somewhat longer drying time. The vapor pressure temperature characteristic of FC–75 also appear in FIGURE 5, along with those of hexane and ethyl alcohol, which can also be employed. Although ethyl alcohol could be employed in so far as its vapor pressure-temperature characteristics are concerned, since ethyl alcohol dissolves in water, it does not have the essential characteristic of the carrier gas Number 2, given in column 16, namely, it is not inert with water.

Another suitable carrier fluorocarbon is manufactured by the E. I. Du Pont de Nemours & Co. of Wilmington, Delaware, under the name of "Freon 214." This fluoronated hydrocarbon is 1,1,1,3-tetra-chloro-tetra-fluoropropane, having the formula $CCl_3CF_2CF_2Cl$.

Its toxicity is low, it boils at 114.5° C., freezes at −92.8° C., has a density at 25° C. of 1.6927, and a specific heat of 0.20 cal./gm./° C at 25° C.

(5) For gravity separation, the carrier must have a specific gravity at the freezing temperature of water or lower, that differs from that of water or ice at those temperatures. This difference must be sufficient to provide gravimetric separation of the liquid carrier gas from both water and ice.

The normal heptane employed in the system described in detail is a saturated paraffin hydrocarbon, and hence is inert, unreactive, and very stable. This would indicate that other, normally liquid hydrocarbons in the methane series would be suitable, and such is the case, as to their chemical characteristics. However, the next lower hydrocarbon in the series, hexane, is not as desirable as heptane from the standpoint of the economy of operation of the system. In the case of hexane, the carrier, in condensing at 6 mm. Hg, would require a condenser temperature of −30° F. The work required for a refrigeration system to operate at this low temperature would be considerably greater than for a system operating at only 5° F. This does not mean however, that hexane could not be used, it would only be less efficient than heptane, in that the power costs would be higher. As can be seen from FIGURE 5, ethyl alcohol could also be used as a carrier, but such a process would require distillation to recapture the alcohol. Hence the use of ethyl alcohol as a carrier gas would require the employment of a commercially impractical distillation and chemical treatment process, if all of the carrier fluid is to be saved or recirculated. If separation of an alcohol carrier liquid and the dissolved water vapor is to be carried out by condensation, as claimed relative to the immiscible carrier in the present invention, then even if the condensation were carried out at a pressure low enough to produce a temperature of −60° (for example), the remaining alcohol would still carry some dissolved water vapor.

In the case of the next higher hydrocarbon, octane, the boiling point temperature is high enough to require that the gas be at a higher temperature than heptane, when introduced into the drying chamber. Thus if octane were used as a carrier, the ice core temperature, and the attendant low pressure required in the drying chamber to insure sublimation without melting, would represent ambient conditions such that the octane gas would condense out in the drying chamber, and hence could not sweep out the water vapor.

To summarize inherent characteristics of the carrier fluids mentioned, at a temperature of 32° F., octane will liquefy at a pressure of 3 mm. of mercury. This is below the triple point pressure of water at 32° F., which is 4.6 mm. of mercury, and hence renders octane of little value as a carrier fluid because it could readily condense in the drying chamber.

Heptane will liquefy at 16 mm. of mercury at 32° F., which pressure is somewhat higher than the triple point pressure of water, but is not so high as to render the use of heptane inefficient. The fluorocarbons, such as FC–75, have characteristics much like those of heptane, namely, they will not liquefy at 32° F., at a pressure lower than 4.6 mm. of mercury, but they will liquefy at the maximum pressure in the Operating Zone, namely, 30 mm. of Hg.

The term "fluorocarbon" in the appended claims refers to a fluorocarbon having the characteristics just described.

Hexane liquefies at a pressure of 54 mm. of mercury, at 32° F. This pressure required for condensation is too high for optimum efficiency of operation.

Nitrogen and other fixed gases of the air have critical temperatures in the order of −233° F., and even at these low temperatures very high pressures are required for liquefication. Hence gases of this nature cannot be used at all in the condensation process of the present invention.

Although the embodiment of the invention that has been described in detail is a batch process, since ultra low pressures are not required in the drying chamber, as in the case of the conventional high vacuum freeze drying process, the present invention lends itself to continuous operation. Air locks would be required. An air lock system suitable for use in the present invention is described in the patent to H. L. Smith, Jr., 2,515,098, July 11, 1950.

Also, liquid concentrates, such as coffee concentrate, can be dried in a continuous system operating in accordance to the present invention. A continuous conveyor system that will handle concentrates appears in the patent to H. O. McMahon, 2,602,573, December 9, 1952.

Although a separate duct 18 is shown for connecting the drying chamber 10 with the main vapor condenser 20, these are functionally one chamber, and are to be so regarded in the appended claims.

In a batch process, the refrigeration coils 44 in the main condenser need not be defrosted during drying, they can be defrosted at the end of the drying cycle.

If heated trays 14 are used, part or all of the carrier gas superheater 80 can be dispensed with, and the carrier gas relied upon to pick up heat from the trays and conduct it to the ice core of the material.

Having completed a detailed description of a method and apparatus for drying articles in accordance with the invention so that those skilled in the art may practice the invention, we claim:

1. A closed cycle method of drying frozen porous material comprising the steps of introducing a hot dry carrier gas at a sub-atmospheric pressure into a drying chamber containing the frozen material, causing said carrier gas to sweep across the material and through the drying chamber to supply the heat of sublimation and to carry away water vapor from the surface of the material that has sublimed from the ice core of the material, maintaining a flow rate of carrier gas sufficient to maintain the water vapor pressure over the ice core in the material below the triple point, condensing the mixture of carrier gas and water vapor that leaves the drying chamber while simultaneously reducing the total vapor pressure of the carrier gas and water vapor leaving the drying chamber to a second pressure below that at which the carrier gas was introduced into the drying chamber, maintaining the range between said first and second pressures within the transition zone of the thermal conductivity-pressure curve of the carrier gas, separating the water from the liquefied carrier gas, revaporizing the liquefied carrier gas, adding the heat of sublimation of ice to the carrier gas, and recirculating the hot, dry carrier gas through the drying chamber, said carrier gas being inert, immiscible with water and stable, said carrier gas having a relatively high ratio of mass specific heat in its vapor phase to its latent heat of vaporization, said carrier gas having a vapor pressure-temperature curve that generally follows that for water, but is displaced upwardly therefrom on the temperature scale to a degree sufficient for preventing condensation of the carrier gas in the drying chamber, due to minor variations in operating conditions.

2. The method of drying frozen water bearing material disposed in a drying chamber having a gas inlet and a gas outlet, comprising the steps of introducing into the drying chamber inlet a dry, readily condensable carrier fluid that is immiscible with water and which condenses at a pressure higher than the triple point pressure of water, the carrier fluid being introduced at a sub-atmospheric pressure that is somewhat higher than the triple point pressure of water but is lower than its liquefication pressure at 32° F., the temperature of the introduced carrier fluid substantially exceeding 32° F., which causes the carrier fluid to be in its gaseous state when introduced into the drying chamber; supplying the heat of sublimation to the frozen material, and establishing a pumping head differential pressure across the inlet and the outlet of the drying chamber for causing the carrier gas to flow through the drying chamber and sweep away water vapor sublimed from the frozen material, said pumping head being established by simultaneously condensing both the carrier gas and the entrained water vapor leaving the drying chamber at a rate of condensation sufficient to maintain the partial pressure of the water vapor in the drying chamber below the triple point pressure of water, and at a rate of condensation sufficient to maintain the partial pressure of the carrier gas leaving the drying chamber lower than the sub-atmospheric pressure of the carrier gas entering the drying chamber.

3. The method of claim 2, including the steps of isolating the condensed carrier gas from the condensed water vapor, re-vaporizing the condensed carrier gas to the said sub-atmospheric introduction pressure by the application of heat to the carrier gas, and re-introducing the re-vaporized carrier gas directly into the drying chamber without employing a carrier gas pump.

4. The method of claim 3, wherein the carrier gas is superheated after re-vaporization, but before re-introduction into the drying chamber.

5. The method of claim 2, wherein pressure difference between the pressure of the carrier gas entering the drying chamber and the total pressure of the carrier gas and entrained water vapor leaving the drying chamber, lies within the TRANSITION ZONE for the carrier gas selected, as in the example described graphically in FIGURES 2 and 4.

6. The method of claim 2, wherein the carrier fluid is heptane.

7. The method of claim 2, wherein the carrier fluid is a fluorocarbon.

8. Apparatus for removing a vaporizable component by sublimation from a material to be dried that includes the vaporizable component in the solid state; said apparatus comprising a drying chamber having a carrier gas inlet duct and a combined carrier gas and sublimed vapor outlet duct, means for supporting the material to be dried in said drying chamber, a vapor condensing chamber connected to the outlet duct of said drying chamber and having a liquid sump, a refrigeration system having a combined vapor condensing-refrigerant evaporating heat exchanger within said vapor condensing chamber, means for evacuating air or other inert gas from said condensing chamber, a liquefied carrier boiler, means for delivering liquefied carrier fluid from said vapor condensing chamber sump to said boiler for revaporizing the carrier fluid, a readily condensible carrier fluid in said apparatus; said carrier fluid being immiscible with the vaporizable component, said carrier fluid being in its vapor phase in said ducts, drying chamber, and in the upper portion of said vapor condensing chamber; said carrier fluid being in its liquid phase in the sump of said vapor condensing chamber and in said boiler, said refrigeration system also including a compressor having an inlet connected to said vapor condensing-refrigerant evaporating heat exchanger in said vapor condensing chamber, a refrigerant condenser immersed in the liquid carrier in said boiler, and means for connecting said refrigerant condenser between said combined vapor condensing-refrigerant evaporating heat exchanger in the vapor condensing chamber, and the compressor outlet.

9. The drying apparatus of claim 8, wherein said means for supporting the material to be dried is disposed between said drying chamber inlet and outlet ducts, is pervious to gas, and extends across the drying chamber for providing the sole path for the passage of carrier gas through the drying chamber.

10. Freeze drying apparatus comprising a drying chamber having inlet and outlet ducts, means for supporting the material to be dried in said drying chamber, means for admitting a condensable heat carrier gas into said inlet duct, said carrier gas being immiscible with, and less dense than water, a vapor condensing chamber connected to the outlet duct of said drying chamber for receiving carrier gas and water vapor, said vapor condensing chamber having a sump, a boiler having a carrier liquid chamber and a carrier gas discharge duct, means connecting the boiler gas discharge duct to the inlet duct of said drying chamber, means for conducting liquefied carrier gas from an upper portion of said vapor condensing chamber sump to the liquid chamber of said boiler, an ice melter having a liquid chamber, means connecting a lower portion of said ice melter chamber to a lower portion of said vapor condensing chamber sump for conducting a slurry of liquefied carrier gas and ice crystals to the chamber of said ice melter, means for withdrawing water from the lower portion of said ice melter chamber, means connecting an upper portion of said ice melter chamber to the liquid chamber of said boiler for conducting liquefied carrier gas to the boiler chamber; a refrigeration system, said system comprising a compressor, a first refrigerant cooling heat exchanger disposed in said ice melter chamber, means connecting the inlet end of said first heat exchanger to the outlet of said compressor, a second refrigerant cooling heat exchanger disposed in the liquid chamber of said boiler, means for connecting the outlet of said first heat exchanger to the inlet of said second heat exchanger, a combined refrigerant evaporating and vapor condensing heat exchanger disposed in said vapor condensing chamber above the chamber sump, and means connecting said latter heat exchanger between the outlet of said second heat exchanger and the inlet of said compressor.

11. The freeze drying apparatus of claim 10, wherein a superheater for carrier gas that is vaporized in said boiler is disposed in said means connecting the gas discharge duct of said boiler to the inlet duct of said drying chamber.

References Cited by the Examiner

UNITED STATES PATENTS

| | | | |
|---|---|---|---|
| 1,259,410 | 3/1918 | Kapadia | 34—36 |
| 1,654,553 | 1/1928 | Neidich | 34—37 |
| 2,435,503 | 2/1948 | Levinson et al. | 34—36 |
| 2,507,632 | 5/1950 | Hickman | 34—5 |
| 2,751,762 | 6/1956 | Colton | 34—5 X |

PERCY L. PATRICK, *Primary Examiner.*

NORMAN YUDKOFF, *Examiner.*